United States Patent
Grignon

(10) Patent No.: US 10,210,466 B2
(45) Date of Patent: *Feb. 19, 2019

(54) PROVIDING ACCESS TO A PRIVATE RESOURCE IN AN ENTERPRISE SOCIAL NETWORKING SYSTEM

(71) Applicant: salesforce.com, inc., San Francisco, CA (US)

(72) Inventor: Yanik Grignon, Cedar Park, TX (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/599,831

(22) Filed: May 19, 2017

(65) Prior Publication Data

US 2017/0255883 A1    Sep. 7, 2017

Related U.S. Application Data

(63) Continuation of application No. 15/252,781, filed on Aug. 31, 2016, now Pat. No. 9,691,041, which is a
(Continued)

(51) Int. Cl.
*G06F 7/04* (2006.01)
*G06F 17/30* (2006.01)
(Continued)

(52) U.S. Cl.
CPC ............. *G06Q 10/06* (2013.01); *G06Q 50/01* (2013.01); *H04L 63/102* (2013.01)

(58) Field of Classification Search
None
See application file for complete search history.

(56) References Cited

U.S. PATENT DOCUMENTS 5,577,188 A   11/1996 Zhu
5,608,872 A   3/1997 Schwartz et al.
(Continued)

OTHER PUBLICATIONS

U.S. Non-Final Office Action dated Oct. 19, 2015, issued in U.S. Appl. No. 14/268,990.
(Continued)

*Primary Examiner* — Fatoumata Traore
(74) *Attorney, Agent, or Firm* — Weaver Austin Villeneuve & Sampson LLP

(57) ABSTRACT

Disclosed are methods, apparatus, systems, and computer readable storage media for providing access to a private resource in an enterprise social networking system. One or more servers may receive a request for access to a private resource to be granted to a user from a publisher. The publisher may be configured to publish a message as a feed item to one or more feeds, where the message includes a user identification identifying the user. The user does not have access to the private resource. The feed item may be provided to display in the one or more feeds. Access may be granted to the user via the one or more feeds. In some implementations, access may be granted in response to a user input from the feed item associated with a moderator or owner, the moderator or owner having a privilege to control user access to the private resource.

20 Claims, 8 Drawing Sheets

Related U.S. Application Data continuation of application No. 14/268,990, filed on May 2, 2014, now Pat. No. 9,460,474.

(60) Provisional application No. 61/819,181, filed on May 3, 2013.

(51) Int. Cl.
   *G06Q 10/06* (2012.01)
   *G06Q 50/00* (2012.01)
   *H04L 29/06* (2006.01)

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,069,856 B1 | 6/2015 | Lilot et al. |
| 9,460,474 B2 | 10/2016 | Grignon |
| 9,691,041 B2 | 6/2017 | Grignon |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |

(56) References Cited

U.S. PATENT DOCUMENTS

| | | |
|---|---|---|
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0222448 A1 | 9/2009 | Caldwell et al. |
| 2010/0241755 A1 | 9/2010 | Bassett et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0143917 A1* | 6/2012 | Prabaker ........... G06F 17/30165 707/784 |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2016/0371611 A1 | 12/2016 | Grignon |

OTHER PUBLICATIONS

U.S. Notice of Allowance dated Jun. 1, 2016, issued in U.S. Appl. No. 14/268,990.

U.S. Notice of Allowance dated Feb. 23, 2017, issued in U.S. Appl. No. 15/252,781.

"Google Plus Users", Google+Ripples, Oct. 31, 2011 [retrieved on Feb. 21, 2012 from Internet at http://www.googleplusers.com/google-ripples.html], 3 pages.

* cited by examiner

PROVIDING ACCESS TO A PRIVATE RESOURCE IN AN ENTERPRISE SOCIAL NETWORKING SYSTEM

PRIORITY DATA

This patent document is a continuation of and claims priority to and commonly assigned U.S. patent application Ser. No. 15/252,781, titled "PROVIDING ACCESS TO A PRIVATE RESOURCE IN AN ENTERPRISE SOCIAL NETWORKING SYSTEM," by Yanik Grignon, filed on Aug. 31, 2016, which claims priority to U.S. Pat. No. 9,460,474, titled "PROVIDING ACCESS TO A PRIVATE RESOURCE IN AN ENTERPRISE SOCIAL NETWORKING SYSTEM," by Yanik Grignon, filed on May 2, 2014, which claims priority to U.S. Provisional Patent Application No. 61/819,181, titled "SYSTEM AND METHOD FOR ACCESSING MULTI-TENANT DATABASE SYSTEMS VIA SOCIAL FEEDS," by Yanik Grignon, filed on May 3, 2013. The entire disclosures of U.S. patent application Ser. No. 15/252,781, U.S. Pat. No. 9,460,474, and U.S. Provisional Patent Application No. 61/819,181 are hereby incorporated by reference for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This patent document relates generally to providing access to a resource in an enterprise social networking system and, more specifically, to techniques for providing access to a private resource in an enterprise social networking system via one or more feeds.

BACKGROUND

"Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

Database resources can be provided in a cloud computing context. However, using conventional database management techniques, it is difficult to know about the activity of other users of a database system in the cloud or other network. For example, the actions of a particular user, such as a salesperson, on a database resource may be important to the user's boss. The user can create a report about what the user has done and send it to the boss, but such reports may be inefficient, not timely, and incomplete. Also, it may be difficult to identify other users who might benefit from the information in the report.

BRIEF DESCRIPTION OF THE DRAWINGS

The included drawings are for illustrative purposes and serve only to provide examples of possible structures and operations for the disclosed inventive systems, apparatus, and methods for providing access to a private resource in an enterprise social networking system. These drawings in no way limit any changes in form and detail that may be made by one skilled in the art without departing from the spirit and scope of the disclosed implementations.

DETAILED DESCRIPTION

Figure 1A:
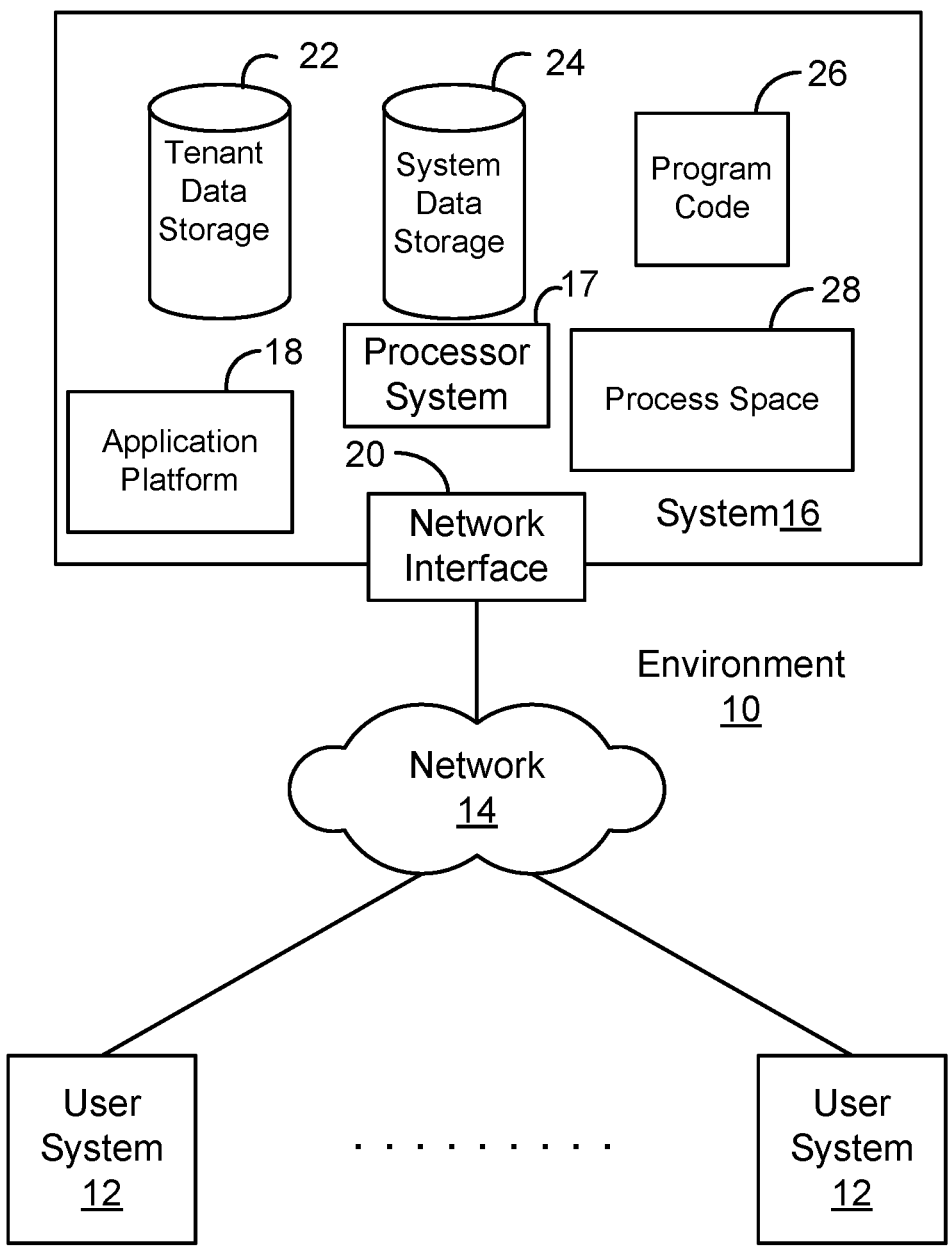
FIG. 1A shows a block diagram of an example of an environment 10 in which an on-demand database service can be used in accordance with some implementations.

Examples of systems, apparatus, and methods according to the disclosed implementations are described in this section. These examples are being provided solely to add context and aid in the understanding of the disclosed implementations. It will thus be apparent to one skilled in the art that implementations may be practiced without some or all of these specific details. In other instances, certain process/method operations, also referred to herein as "blocks," have not been described in detail in order to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined. Conversely, what may be described herein as a single block may be implemented in multiple blocks.

Various implementations described or referenced herein are directed to different methods, apparatus, systems, and computer-readable storage media for providing access to a private resource in an enterprise social networking system.

Enterprise social networking systems are increasingly becoming a common way to facilitate communication among people, any of whom can be recognized as users of a social networking system. One example of an enterprise social networking system is Chatter®, provided by salesforce.com, inc. of San Francisco, Calif. salesforce.com, inc. is a provider of social networking services, customer relationship management (CRM) services and other database management services, any of which can be accessed and used in conjunction with the techniques disclosed herein in some implementations. These various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some enterprise social networking systems can be implemented in various settings, including organizations. For instance, an enterprise social networking system can be implemented to connect users within an enterprise such as a company or business partnership, or a group of users within such an organization. For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail below.

In some enterprise social networking systems, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a graphical user interface (GUI) on a display device such as the display of a computing device as described below. The information updates can include various social network data from various sources and can be stored in an on-demand database service environment. In some implementations, the disclosed methods, apparatus, systems, and computer-readable storage media may be configured or designed for use in a multi-tenant database environment.

In some implementations, an enterprise social networking system may allow a user to follow data objects in the form of records such as cases, accounts, or opportunities, in addition to following individual users and groups of users. The "following" of a record stored in a database, as described in greater detail below, allows a user to track the progress of that record. Updates to the record, also referred to herein as changes to the record, are one type of information update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be user-submitted messages or can otherwise be generated in response to user actions or in response to events. Examples of messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a social network feed displayed on the user's profile page.

In some implementations, a social network feed may be specific to a group of users of an enterprise social networking system. For instance, a group of users may publish a news feed. Members of the group may view and post to this group feed in accordance with a permissions configuration for the feed and the group. Information updates in a group context can also include changes to group status information.

In some implementations, when data such as posts or comments input from one or more users are submitted to a social network feed for a particular user, group, object, or other construct within an enterprise social networking system, an email notification or other type of network communication may be transmitted to all users following the user, group, or object in addition to the inclusion of the data as a feed item in one or more feeds, such as a user's profile feed, a news feed, or a record feed. In some enterprise social networking systems, the occurrence of such a notification is limited to the first instance of a published input, which may form part of a larger conversation. For instance, a notification may be transmitted for an initial post, but not for comments on the post. In some other implementations, a separate notification is transmitted for each such information update.

Conventionally, workflows in the work environment are implemented in an extensive series of exchanges using network communications such as email. An employee prepares and submits a request via email, and one or more recipients of the request appropriately respond by reply emails. Such exchanges can be time-consuming and inefficient.

One example of a workflow is the processing of a sharing request for access to a private resource in an enterprise social networking system. The sharing request can be in the form of a post to a feed, where the post requests that access to the private resource be granted to a user or group of users. Examples of resources include records, groups, user profiles, and various files such as documents, knowledge articles, image files, video files, etc. In some enterprise social networking systems, the resource has a dedicated feed. Such resources can have the status of "private" when access to the resource and its associated feed is restricted to certain users in the enterprise social networking system. For example, access to and viewing of conversation threads submitted to a private group feed may be restricted to only the members of the private group.

In the course of a conversation thread in a feed, various users who don't belong to the private group may be identified in the content of posts, comments, etc. Conventionally, because such users are not members of the private group and are thus unable to access a private group page or private group feed, they are not notified of the conversation and thus unable to contribute to the conversation.

In some systems, users without access to a private resource need to be granted access by a system administrator, a moderator of the resource, an owner (often the user who created and/or made the resource available in the social networking system), or some other user having a privilege to control user access to the private resource and the associated feed. Traditionally, when a user is identified in a feed message such as a post, the author of the feed message or another user with access to the private resource may make a separate request to grant access to the identified user. This is traditionally achieved manually, where the request is sent as a media communication such as an email message, an SMS message, an MMS message, and/or an instant message. The media communication is sent to one or more users having the privilege to control user access to the private resource and the associated feed. However, this media communication creates a separate communication channel from the private resource feed in which collaboration regarding the private resource is happening. Using such a separate communication channel for approval requests can be inefficient, time-consuming, and cumbersome, for instance, when users don't check their email often and instead use social network feeds as their primary channel of interacting with co-workers. Until the request is approved through the separate communication channel, the identified user is unable to participate in and add value to the conversation thread associated with the private resource.

Some of the disclosed systems, apparatus, methods, and computer readable storage media can provide a feed-centric workflow for granting access to a private resource in an enterprise social networking system where users can request and be granted access to resources without having to leave a feed, for example, by switching over to email to perform a workflow or communicate regarding the flow. A workflow can be generated and carried out in the context of a feed and sometimes in different presentations of feeds to different users for approving or denying a request for access to a private resource. The workflow may be implemented as an automated process initiated and customized by a user, wherein customized processing stages are defined but execution of the process is otherwise automated.

Various actions can be taken by a user and/or system events can occur and be identified by a server to initiate a workflow for granting access to a private resource to a user who may or may not be part of the enterprise social networking system, but who does not initially have access to the private resource. For example, when another user is viewing presentation of the private resource feed on that user's smartphone or tablet, that user can operate a publisher to cause a request for access to be generated and sent to one or more servers from the user's device. By way of example, the user can interact with the publisher to generate and transmit a post to the private resource feed, with the content of the post including an @mention of the user for whom access is requested, for instance, "@publicuser". It should be noted that the request for access may be in the form of the @mention of "publicuser" in a feed message when the message is being composed using the publisher, the submission of such a message from the publisher to a feed, or in the form of an explicit post or other feed message requesting that the user be granted access.

In some implementations, the feed message requesting access is published as a feed item in the private resource feed, which is accessible to and viewable by only users who can be identified as having access to the private resource, such as users named in a membership roster or list. The feed message is also published as a feed item in a feed accessible by a moderator or other type of user having a privilege to control user access to the private resource, such as the moderator's news feed. In such implementations, the feed item published to the moderator's news feed is presented in a graphical display on the moderator's device to include an actionable component, which the moderator can interact with using the moderator's device to approve, deny, ignore, or reassign the request for access. When the moderator's device sends a signal to a server indicating that access to the private resource is approved, the user for whom access is approved receives the feed item or a notification of the feed item in his/her news feed. In some implementations, the user for whom access is approved can select the presentation of the feed item in his/her news feed to "click through" to view a presentation of the private resource feed and view other related feed items defining a conversation thread. In some instances, the user for whom access is approved is temporarily or permanently added as a member when the resource is a private group or is otherwise granted limited or unlimited privileges to collaborate about, read and/or write to the private resource and any related objects or documents. Thus, in some examples, a workflow for approving a sharing request for a private resource can be implemented without leaving the feed, in other words, can be built into the same channel (a feed) in which collaboration is occurring with respect to the private resource.

By way of an example, an author of a post can publish to a record feed, where the post includes an @mention to a user who does not have access to the record. Since the user would be unable to access or view the feed, @mentioning the user is senseless. Rather than manually sharing the record, the @mention itself can trigger a workflow to occur so that approval of access to the record can happen through the record feed.

In another example, user A owns a private photo and chooses to tag user B. User B gains access to the private photo, and then tags user C. However, since user B is not the owner of the private photo, access for user C is subject to user A's approval. In this case, the tag can trigger a workflow to occur so that approval of access to the photo can happen.

In yet another example, a member of a private group can reference a non-member in a discussion through an @mention. The @mention can trigger a workflow to occur so that the moderator of the private group receives an approval request.

These and other implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to, magnetic media such as hard disks, floppy disks, and magnetic tape; optical media such as CD-ROM disks; magneto-optical media; and hardware devices that are specially configured to store program instructions, such as read-only memory ("ROM") devices and random access memory ("RAM") devices. These and other features of the disclosed implementations will be described in more detail below with reference to the associated drawings.

The term "multi-tenant database system" can refer to those systems in which various elements of hardware and software of a database system may be shared by one or more customers. For example, a given application server may simultaneously process requests for a great number of customers, and a given database table may store rows of data such as feed items for a potentially much greater number of customers. The term "query plan" generally refers to one or more operations used to access information in a database system.

A "user profile" or "user's profile" is generally configured to store and maintain data about a given user of the database system. The data can include general information, such as name, title, phone number, a photo, a biographical summary, and a status, e.g., text describing what the user is currently doing. As mentioned below, the data can include messages created by other users. Where there are multiple tenants, a user is typically associated with a particular tenant. For example, a user could be a salesperson of a company, which is a tenant of the database system that provides a database service.

The term "record" generally refers to a data entity, such as an instance of a data object created by a user of the database service, for example, about a particular (actual or potential) business relationship or project. The data object can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "information feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different information feeds. A second user following a first user and a record can receive the feed items associated with the first user and the record for display in the second user's news feed, which is another type of information feed. In some implementations, the feed items from any number of followed users and records can be combined into a single information feed of a particular user.

As examples, a feed item can be a message, such as a user-generated post of text data, and a feed tracked update to a record or profile, such as a change to a field of the record. Feed tracked updates are described in greater detail below. A feed can be a combination of messages and feed tracked updates. Messages include text created by a user, and may include other data as well. Examples of messages include posts, user status updates, and comments. Messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a graphical user interface (GUI), for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group. In one implementation, there is only one status for a record.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Messages and feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and messages, such as posts, comments, likes, etc., can define group conversations and change over time.

An "entity feed" or "record feed" generally refers to a feed of feed items about a particular record in the database, such as feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" is a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

I. General Overview

Systems, apparatus, and methods are provided for implementing enterprise level social and business information networking. Such implementations can provide more efficient use of a database system. For instance, a user of a database system may not easily know when important information in the database has changed, e.g., about a project or client. Implementations can provide feed tracked updates about such changes and other events, thereby keeping users informed.

By way of example, a user can update a record, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed right to the manager's feed page or other page.

Next, mechanisms and methods for providing systems implementing enterprise level social and business information networking will be described with reference to several implementations. First, an overview of an example of a database system is described, and then examples of tracking events for a record, actions of a user, and messages about a user or record are described. Various implementations about the data structure of feeds, customizing feeds, user selection of records and users to follow, generating feeds, and displaying feeds are also described.

II. System Overview

FIG. 1A shows a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

Environment 10 is an environment in which an on-demand database service exists. User system 12 may be implemented as any computing device(s) or other data processing apparatus such as a machine or system that is used by a user to access a database system 16. For example, any of user systems 12 can be a handheld computing device, a mobile phone, a laptop computer, a work station, and/or a network of such computing devices. As illustrated in FIG. 1A (and in more detail in FIG. 1B) user systems 12 might interact via a network 14 with an on-demand database service, which is implemented in the example of FIG. 1A as database system 16.

An on-demand database service, implemented using system 16 by way of example, is a service that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 1A, implements a web-based customer relationship management (CRM) system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 1B:
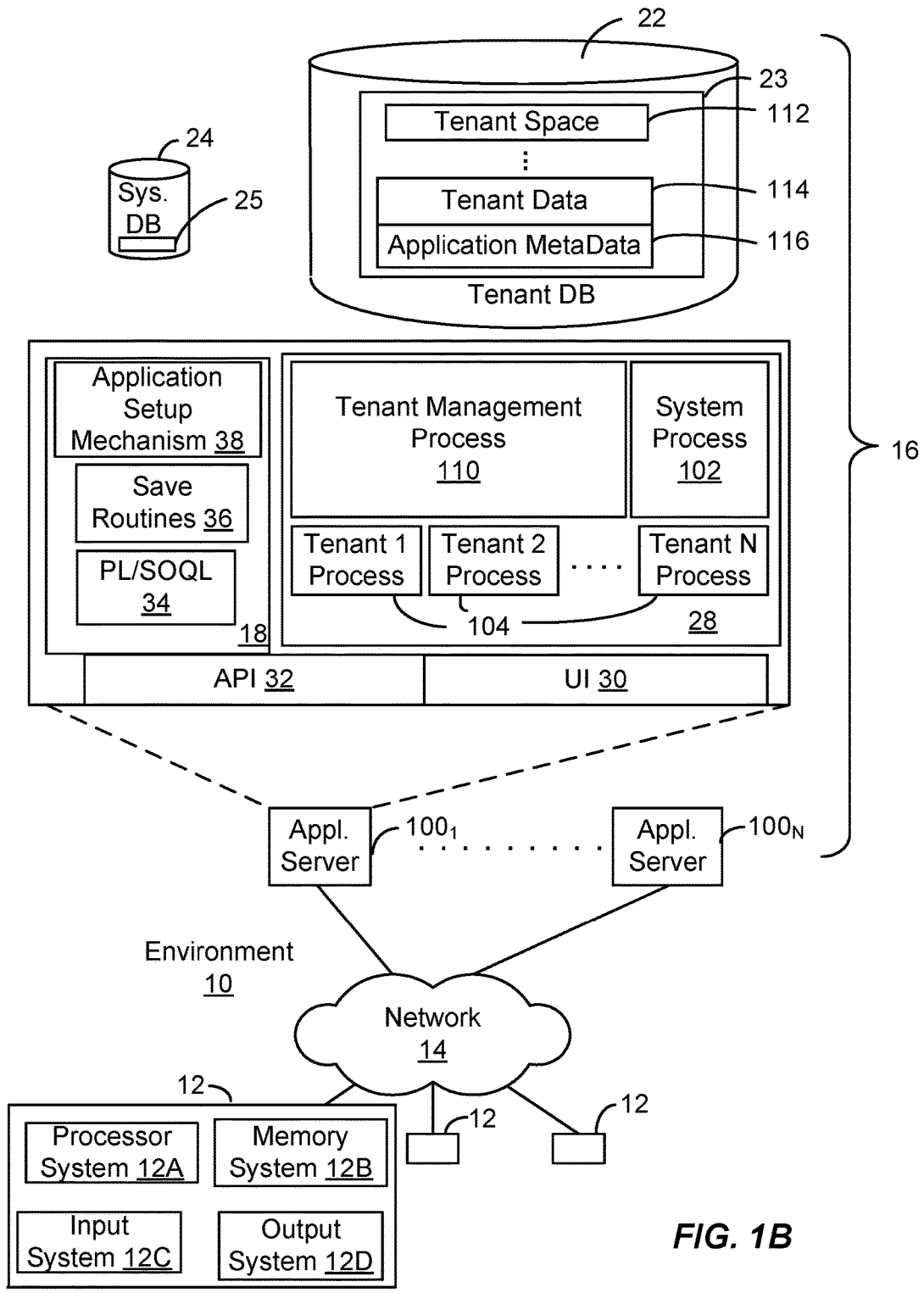
FIG. 1B shows a block diagram of an example of some implementations of elements of FIG. 1A and various possible interconnections between these elements.

One arrangement for elements of system 16 is shown in FIGS. 1A and 1B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a graphical user interface (GUI) provided by the browser on a display (e.g., a monitor screen, LCD display, etc.) of the computing device in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to a computing device or system, including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 1B shows a block diagram of an example of some implementations of elements of FIG. 1A and various possible interconnections between these elements. That is, FIG. 1B also illustrates environment 10. However, in FIG. 1B elements of system 16 and various interconnections in some implementations are further illustrated. FIG. 1B shows that user system 12 may include processor system 12A, memory system 12B, input system 12C, and output system 12D. FIG. 1B shows network 14 and system 16. FIG. 1B also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers 1001-100N, system process space 102, tenant process spaces 104, tenant management process space 110, tenant storage space 112, user storage 114, and application metadata 116. In other implementations, environment 10 may not have the same elements as those listed above and/or may have other elements instead of, or in addition to, those listed above.

User system 12, network 14, system 16, tenant data storage 22, and system data storage 24 were discussed above in FIG. 1A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 1B, system 16 may include a network interface 20 (of FIG. 1A) implemented as a set of HTTP application servers 100, an application platform 18, tenant data storage 22, and system data storage 24. Also shown is system process space 102, including individual tenant process spaces 104 and a tenant management process space 110. Each application server 100 may be configured to communicate with tenant data storage 22 and the tenant data 23 therein, and system data storage 24 and the system data 25 therein to serve requests of user systems 12. The tenant data 23 might be divided into individual tenant storage spaces 112, which can be either a physical arrangement and/or a logical arrangement of data. Within each tenant storage space 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage space 112. A UI 30 provides a user interface and an API 32 provides an application programmer interface to system 16 resident processes to users and/or developers at user systems 12. The tenant data and the system data may be stored in various databases, such as one or more Oracle databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server 1001 might be coupled via the network 14 (e.g., the Internet), another application server 100N-1 might be coupled via a direct network link, and another application server 100N might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain implementations, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one implementation, therefore, an interface system implementing a load balancing function (e.g., an F5 Big-IP load balancer) is communicably coupled between the application servers 100 and the user systems 12 to distribute requests to the application servers 100. In one implementation, the load balancer uses a least connections algorithm to route user requests to the application servers 100. Other examples of load balancing algorithms, such as round robin and observed response time, also can be used. For example, in certain implementations, three consecutive requests from the same user could hit three different application servers 100, and three requests from different users could hit the same application server 100. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 100 to request and update system-level and tenant-level data from system 16 that may involve sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
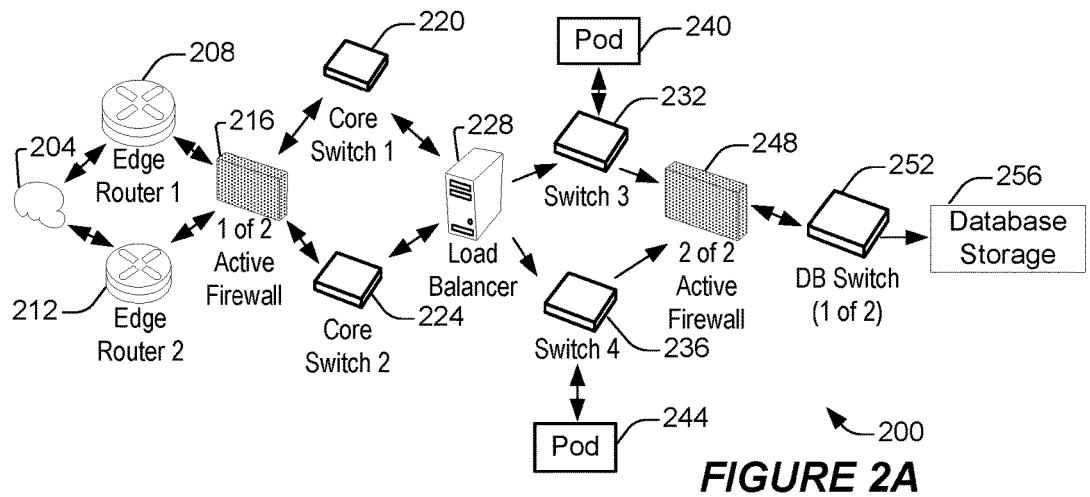
FIG. 2A shows a system diagram illustrating an example of architectural components of an on-demand database service environment 200 according to some implementations.

FIG. 2A shows a system diagram illustrating an example of architectural components of an on-demand database service environment 200 according to some implementations. A client machine located in the cloud 204, generally referring to one or more networks in combination, as described herein, may communicate with the on-demand database service environment via one or more edge routers 208 and 212. A client machine can be any of the examples of user systems 12 described above. The edge routers may communicate with one or more core switches 220 and 224 via firewall 216. The core switches may communicate with a load balancer 228, which may distribute server load over different pods, such as the pods 240 and 244. The pods 240 and 244, which may each include one or more servers and/or other computing resources, may perform data processing and other operations used to provide on-demand services. Communication with the pods may be conducted via pod switches 232 and 236. Components of the on-demand database service environment may communicate with a database storage 256 via a database firewall 248 and a database switch 252.

Figure 2B:
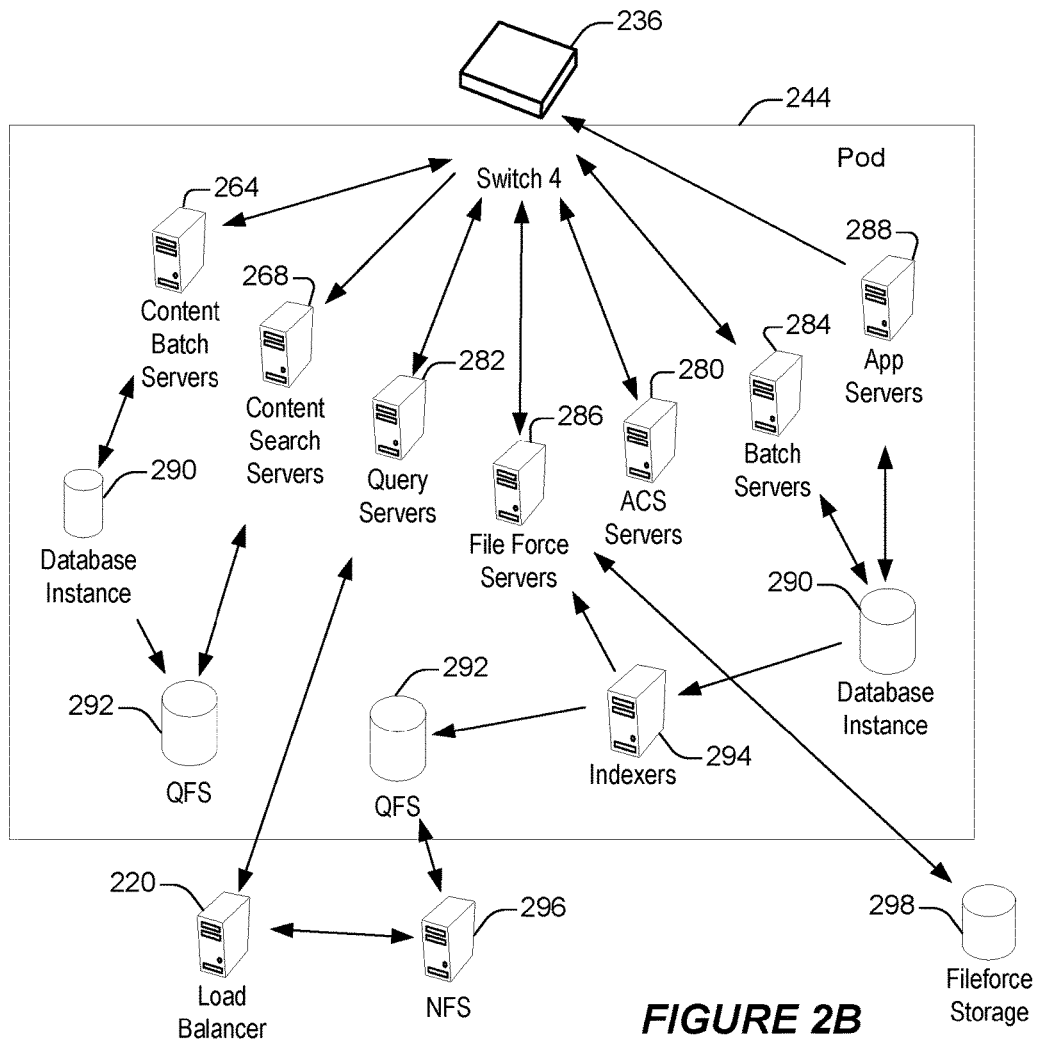
FIG. 2B shows a system diagram further illustrating an example of architectural components of an on-demand database service environment according to some implementations.

As shown in FIGS. 2A and 2B, accessing an on-demand database service environment may involve communications transmitted among a variety of different hardware and/or software components. Further, the on-demand database service environment 200 is a simplified representation of an actual on-demand database service environment. For example, while only one or two devices of each type are shown in FIGS. 2A and 2B, some implementations of an on-demand database service environment may include anywhere from one to many devices of each type. Also, the on-demand database service environment need not include each device shown in FIGS. 2A and 2B, or may include additional devices not shown in FIGS. 2A and 2B.

Moreover, one or more of the devices in the on-demand database service environment 200 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 204 is intended to refer to a data network or plurality of data networks, often including the Internet. Client machines located in the cloud 204 may communicate with the on-demand database service environment to access services provided by the on-demand database service environment. For example, client machines may access the on-demand database service environment to retrieve, store, edit, and/or process information.

In some implementations, the edge routers 208 and 212 route packets between the cloud 204 and other components of the on-demand database service environment 200. The edge routers 208 and 212 may employ the Border Gateway Protocol (BGP). The BGP is the core routing protocol of the Internet. The edge routers 208 and 212 may maintain a table of IP networks or 'prefixes', which designate network reachability among autonomous systems on the Internet.

In one or more implementations, the firewall 216 may protect the inner components of the on-demand database service environment 200 from Internet traffic. The firewall 216 may block, permit, or deny access to the inner components of the on-demand database service environment 200 based upon a set of rules and other criteria. The firewall 216 may act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 may be configured as network bridges that quickly route data between different components within the on-demand database service environment. In some implementations, the use of two or more core switches 220 and 224 may provide redundancy and/or reduced latency.

In some implementations, the pods 240 and 244 may perform the core data processing and service functions provided by the on-demand database service environment. Each pod may include various types of hardware and/or software computing resources. An example of the pod architecture is discussed in greater detail with reference to FIG. 2B.

In some implementations, communication between the pods 240 and 244 may be conducted via the pod switches 232 and 236. The pod switches 232 and 236 may facilitate communication between the pods 240 and 244 and client machines located in the cloud 204, for example via core switches 220 and 224. Also, the pod switches 232 and 236 may facilitate communication between the pods 240 and 244 and the database storage 256.

In some implementations, the load balancer 228 may distribute workload between the pods 240 and 244. Balancing the on-demand service requests between the pods may assist in improving the use of resources, increasing throughput, reducing response times, and/or reducing overhead. The load balancer 228 may include multilayer switches to analyze and forward traffic.

In some implementations, access to the database storage 256 may be guarded by a database firewall 248. The database firewall 248 may act as a computer application firewall operating at the database application layer of a protocol stack. The database firewall 248 may protect the database storage 256 from application attacks such as structure query language (SQL) injection, database rootkits, and unauthorized information disclosure.

In some implementations, the database firewall 248 may include a host using one or more forms of reverse proxy services to proxy traffic before passing it to a gateway router. The database firewall 248 may inspect the contents of database traffic and block certain content or database requests. The database firewall 248 may work on the SQL application level atop the TCP/IP stack, managing applications' connection to the database or SQL management interfaces as well as intercepting and enforcing packets traveling to or from a database network or application interface.

In some implementations, communication with the database storage 256 may be conducted via the database switch 252. The multi-tenant database storage 256 may include more than one hardware and/or software components for handling database queries. Accordingly, the database switch 252 may direct database queries transmitted by other components of the on-demand database service environment (e.g., the pods 240 and 244) to the correct components within the database storage 256.

In some implementations, the database storage 256 is an on-demand database system shared by many different organizations. The on-demand database system may employ a multi-tenant approach, a virtualized approach, or any other type of database approach. An on-demand database system is discussed in greater detail with reference to FIGS. 1A and 1B.

FIG. 2B shows a system diagram further illustrating an example of architectural components of an on-demand database service environment according to some implementations. The pod 244 may be used to render services to a user of the on-demand database service environment 200. In some implementations, each pod may include a variety of servers and/or other systems. The pod 244 includes one or more content batch servers 264, content search servers 268, query servers 282, file force servers 286, access control system (ACS) servers 280, batch servers 284, and app servers 288. Also, the pod 244 includes database instances 290, quick file systems (QFS) 292, and indexers 294. In one or more implementations, some or all communication between the servers in the pod 244 may be transmitted via the switch 236.

In some implementations, the app servers 288 may include a hardware and/or software framework dedicated to the execution of procedures (e.g., programs, routines, scripts) for supporting the construction of applications provided by the on-demand database service environment 200 via the pod 244. In some implementations, the hardware and/or software framework of an app server 288 is configured to execute operations of the services described herein, including performance of the blocks of methods described with reference to FIGS. 3-9. In alternative implementations, two or more app servers 288 may be included and cooperate to perform such methods, or one or more other servers described herein can be configured to perform the disclosed methods.

The content batch servers 264 may handle requests internal to the pod. These requests may be long-running and/or not tied to a particular customer. For example, the content batch servers 264 may handle requests related to log mining, cleanup work, and maintenance tasks.

The content search servers 268 may provide query and indexer functions. For example, the functions provided by the content search servers 268 may allow users to search through content stored in the on-demand database service environment.

The file force servers 286 may manage requests for information stored in the Fileforce storage 298. The Fileforce storage 298 may store information such as documents, images, and basic large objects (BLOBs). By managing requests for information using the file force servers 286, the image footprint on the database may be reduced.

The query servers 282 may be used to retrieve information from one or more file systems. For example, the query system 282 may receive requests for information from the app servers 288 and then transmit information queries to the NFS 296 located outside the pod.

The pod 244 may share a database instance 290 configured as a multi-tenant environment in which different organizations share access to the same database. Additionally, services rendered by the pod 244 may call upon various hardware and/or software resources. In some implementations, the ACS servers 280 may control access to data, hardware resources, or software resources.

In some implementations, the batch servers 284 may process batch jobs, which are used to run tasks at specified times. Thus, the batch servers 284 may transmit instructions to other servers, such as the app servers 288, to trigger the batch jobs.

In some implementations, the QFS 292 may be an open source file system available from Sun Microsystems® of Santa Clara, Calif. The QFS may serve as a rapid-access file system for storing and accessing information available within the pod 244. The QFS 292 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 268 and/or indexers 294 to identify, retrieve, move, and/or update data stored in the network file systems 296 and/or other storage systems.

In some implementations, one or more query servers 282 may communicate with the NFS 296 to retrieve and/or update information stored outside of the pod 244. The NFS 296 may allow servers located in the pod 244 to access information to access files over a network in a manner similar to how local storage is accessed.

In some implementations, queries from the query servers 222 may be transmitted to the NFS 296 via the load balancer 228, which may distribute resource requests over various resources available in the on-demand database service environment. The NFS 296 may also communicate with the QFS 292 to update the information stored on the NFS 296 and/or to provide information to the QFS 292 for use by servers located within the pod 244.

In some implementations, the pod may include one or more database instances 290. The database instance 290 may transmit information to the QFS 292. When information is transmitted to the QFS, it may be available for use by servers within the pod 244 without using an additional database call.

In some implementations, database information may be transmitted to the indexer 294. Indexer 294 may provide an index of information available in the database 290 and/or QFS 292. The index information may be provided to file force servers 286 and/or the QFS 292.

Figure 3:
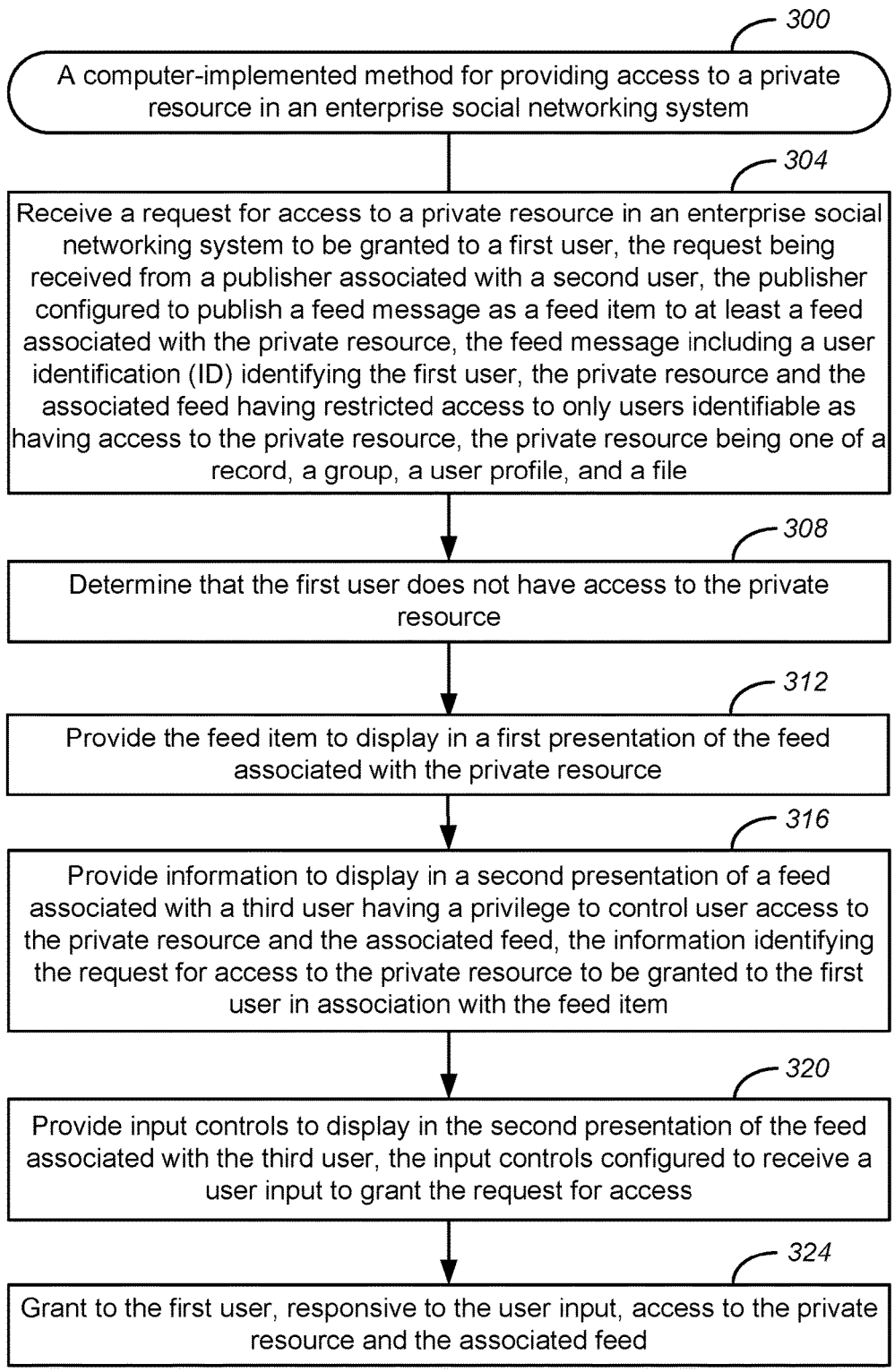
FIG. 3 shows a flowchart of an example of a computer-implemented method 300 for providing access to a private resource in an enterprise social networking system, according to some implementations.

III. Providing Access to a Private Resource in an Enterprise Social Networking System FIG. 3 shows a flowchart of an example of a computer-implemented method 300 for providing access to a private resource in an enterprise social networking system, according to some implementations. The method 300 shows a high-level overview of the types of operations that may be performed in providing access to a private resource in an enterprise social networking system. The operations in the method 300 may be performed in different orders and/or with different, fewer, or additional operations. The method 300 may be described with reference to some examples as illustrated in FIGS. 4-9.

At block 304, a request for access to a private resource in an enterprise social networking system to be granted to a first user is received at one or more servers. The request is received from a publisher associated with a second user, where the publisher is configured to publish a feed message as a feed item to at least a feed associated with the private resource. The feed message includes a user identification (ID) identifying the first user. The private resource and the associated feed have restricted access to only users identifiable as having access to the private resource. In some implementations, the private resource is one of a record, a group, a user profile, and a file. In some implementations, the one or more servers are associated with the enterprise social networking system.

An enterprise social networking system, such as Chatter®, may include one or more databases. The one or more databases may store a plurality of resources. Access to some of the resources in an enterprise social networking system may be limited, where the resource may be restricted to only users identified as having access to the resource. A moderator, owner, or some other user having a privilege to control user access may manage access to the resource. Thus, some users in an enterprise social networking system may have access to an resource while other users in the enterprise social networking system may not have access to the resource. Such resources can have the status of "private" when access to the resource and its associated feed is restricted to certain users in the enterprise social networking system.

A feed may be associated with a private resource in the enterprise social networking system. For example, a group newsfeed may be associated with a group. A user's news feed may be associated with a user profile. A record feed may be associated with a record. A photo feed may be associated with a photo. In an enterprise social networking system, collaboration can occur among users via a feed in a private resource. For example, a conversation thread can develop in a private resource feed as users publish posts, comments, likes/dislikes, etc. in the feed. In some implementations, users also can perform interactions with the private resource through the feed, such as attaching files, conducting polls, updating a record, creating a new record, deleting a record, converting a record, adding a link, sending an email, logging a bug, and logging a phone call. As will be discussed in further detail below, users also can conduct a workflow to approve or deny a request for access to the private resource through the feed.

To publish to the feed and perform actions through the feed, users may utilize a publisher. A publisher is an interface that allows a user to publish information that will be provided to the feed. When a user has access to a private resource, the user may be able to perform actions on the feed using the publisher as displayed in a user interface of a user's display device. In some implementations, the one or more servers may provide data to a device capable of generating a user interface including the publisher on a display of the device. The publisher may include a publisher component selectable to request the first user to have access to the private resource.

Figure 6:
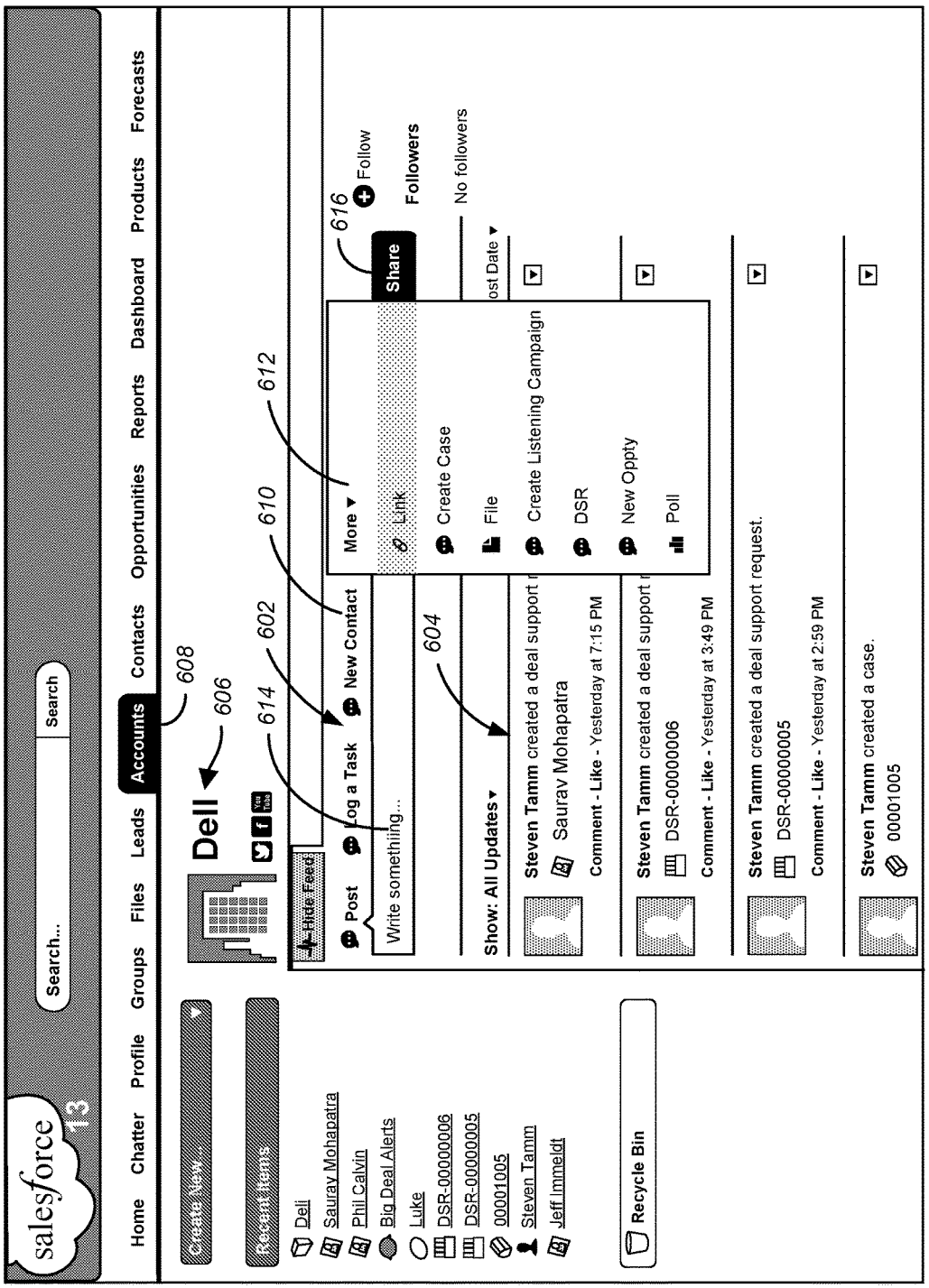
FIG. 6 shows an example of a user interface for a record including a publisher and a record feed, according to some implementations.

FIG. 6 shows an example of a user interface for a record including a publisher and a record feed, according to some implementations. In FIG. 6, a user interface for an accounts page 606 for Dell is displayed on a display device. A user may navigate to the accounts page 606 by selecting a tab 608 from among a plurality of tabs in the user interface. A request to interact with a record and its associated feed may be generated in response to a user selecting a button, link, tab, or menu selection in the publisher 602. In some implementations, the record may be related to a parent record that is associated with the accounts page 606. The publisher 602 may include one or more publisher actions 610 to allow a user to make a request to interact with the record and its associated feed. Examples of such publisher actions 610 as displayed in the publisher 602 include "Post", "Log a Task", and "New Contact". As illustrated in the example in FIG. 6, selecting "More" initiates a drop-down menu 612 to allow a user to select from more publisher actions 610 to interact with the record and its associated feed. Such additional publisher actions 610 include "Link", "Create Case", "File", "Create Listening Campaign", "DSR", "New Oppty", and "Poll". In addition, the publisher 602 in the accounts page 606 includes a text box 614 for entry of a feed message. The publisher 602 also includes a share button 616 to transmit data from the publisher 602, including the message in the text box 614, to one or more servers associated with the enterprise social networking system. At least some of the data may be provided from the publisher 602 to a feed item of a record feed 604 associated with the record.

Information updates to a feed, such as the record feed 604, can include a message. Examples of messages can include: posts, comments, indications of a user's personal preferences such as "likes" and dislikes", updates to a user's status, uploaded files, and user-submitted hyperlinks to social network data or other network data such as various documents and/or web pages on the Internet. The above-referenced messages can be feed messages provided by a publisher, such as the publisher 602.

Returning to the method 300 of FIG. 3, the feed message received from the publisher can include a user ID identifying a first user. The second user can compose the feed message in the publisher from the second user's display device, which the second user can operate to cause the request for access to be generated and sent to the one or more servers. The first user may belong to the enterprise social networking system but may not be identifiable as having access to the private resource. In some implementations, the method 300 can further determine that the first user belongs to the enterprise social networking system.

In some implementations, the feed message can include a symbol in the form of a hashtag or an @mention in combination with the user ID. An @mention may also be referred to as @replies or tagging. The @mention may reference or link to a user's profile in the enterprise social networking system. A hashtag may also be referred to as a metadata tag.

Figure 7:
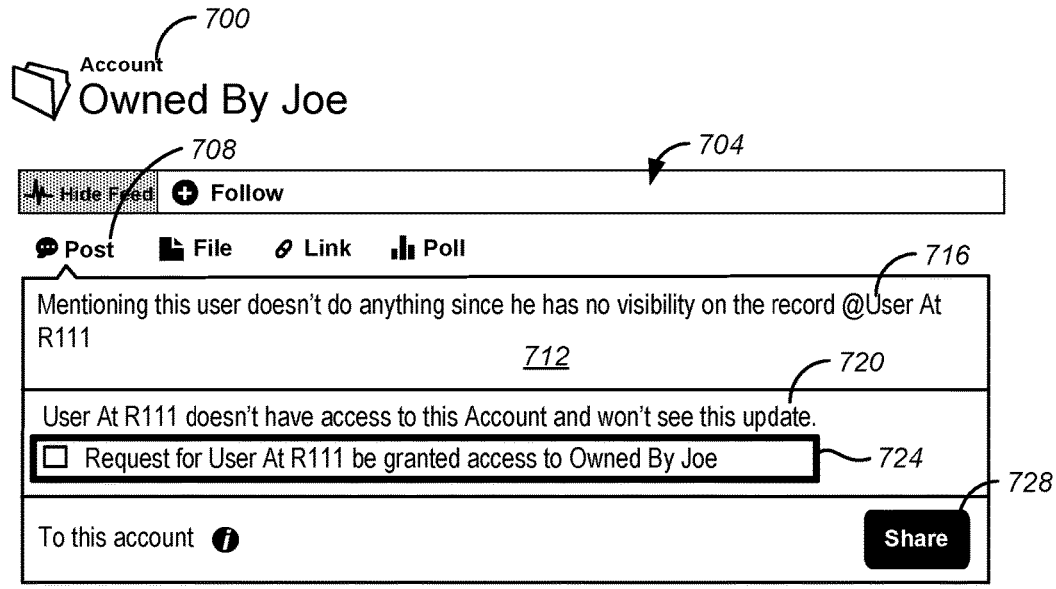
FIG. 7 shows an example of a user interface for an account including a feed message having a user identification (ID) identifying a user without access to the account.

FIG. 7 shows an example of a user interface for an account including a feed message having a user ID identifying a user without access to the account. The user interface for an account 700 owned by Joe can include a publisher 704. The publisher 704 can include a plurality of publisher actions 708, including a publisher action 708 to post a feed message 712 to a feed associated with the account 700. To post the feed message 712, a user can enter alpha-numeric or other character-based user inputs such as words, phrases, statements, questions, emotional expressions, and/or symbols into a component for receiving such inputs, such as a text box. The feed message 712 can include a symbol in the form of an @mention 716 to User At R111.

Returning to the method 300 of FIG. 3, the request for access to the private resource can be made to the one or more servers associated with the enterprise social networking system. The request for access can be made upon an indication of an event from the publisher. The event can be an action taken by a user and/or system events identified by the one or more servers. The event can initiate a workflow for granting access to the first user. The event can include receiving from the publisher the user ID identifying the first user. For example, as the second user enters the user ID into the feed message with a symbol in the form of an @mention or hashtag, the one or more servers associated with the enterprise social networking system can detect the entry of the user ID and perform a comparison of the user ID against the membership database. The request for access can be simultaneous with detection of the entry of the user ID. In another example, after the user enters the user ID into the feed message and requests publication of the feed message as a feed item to one or more feeds, the one or more servers associated with the enterprise social networking system can process the user ID in the feed message. In such instances, the request for access can be made simultaneous with the one or more servers receiving the request to publish the feed message. When a publisher is provided with a publisher component selectable to request that the first user have access to the private resource, an input from the second user can be received selecting the publisher component.

At block 308, a determination is made that the first user does not have access to the private resource. Determining that the first user does not have access to the private resource can include comparing the user ID against a membership database, where the membership database identifies the users with access to the private resource in the enterprise social networking system. The membership database may include specific access rights and restrictions of the users according to various attributes of the users. In some implementations, the determination can be made before a request to publish the feed message is received. For example, the one or more servers can make the determination as the second user is typing the feed message in the publisher. In some implementations, the determination can be made after a request to publish the feed message is received.

In FIG. 7, when a determination is made that User At R111 does not have access to the account 700, the publisher 704 can provide a notification 720 that the User At R11 does not have access to the account 700. The notification 720 can also provide information that the User At R111 won't see the update to the feed when the feed message 712 is published to the feed. Without having to post a separate message or otherwise send a separate network communication to the owner of the account 700 (e.g., Joe) or to another user having control over the account 700, a user can click a selectable component 724 to request access to be granted to the User At R111. As illustrated in the FIG. 7, the selectable component 724 can be a checkbox, though it is understood that other components capable of receiving a user input may be provided in the publisher 704. If the user selects the checkbox and clicks the share button 728, a request for access to the account 700 to be granted to the User At R111 may be sent to one or more servers from the publisher 704. When the request is made, a notification can be sent to the owner of the account 700 (e.g., Joe).

Returning to the method 300 of FIG. 3, while the request for access may be included in the feed message to be published to one or more feeds, it is understood that the request for access may be made before requesting publication of the feed message. It is also understood that the determination that the first user does not have access to the private resource can be made before the one or more servers receive the request for access.

Information identifying the request for access and the feed message may be published as a feed item to one or more feeds. Instead of having the request for access sent through a separate communication channel, such as email, the request for access can be sent with the published feed message. The published feed message can include the user ID identifying the first user.

In some implementations, if the second user has a privilege to control user access to the private resource and the associated feed, the second user may grant access to the private resource to the first user without having to submit a request for access. In other words, the second user may grant or deny access to the private resource at the same time as publishing the feed message to one or more feeds. Therefore, a third user, such as a system administrator, moderator of the resource, an owner of the resource, or some other user having a privilege to control user access to the resource and the associated feed does not intervene in deciding to grant or deny a request for access.

At block 312, the feed item is provided to display in a first presentation of the feed associated with the private resource. The feed item may include the feed message and may be accompanied by additional data. For example, the feed item may include the author of the feed message, a timestamp of the feed message, and other metadata. What data is displayed in the feed item may depend on contextual factors, such as the identity of the user accessing the feed item and the feed in which the feed item is provided in. Hence, different presentations of the feed may be rendered depending on the contextual factors.

Figure 8:
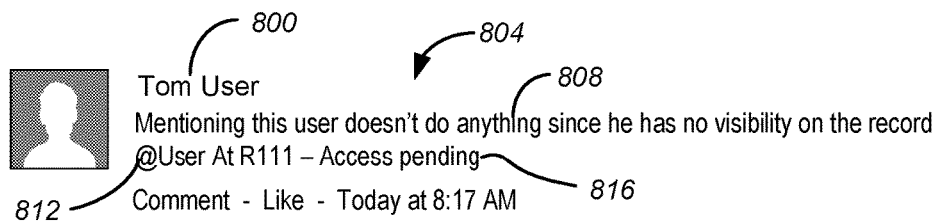
FIG. 8 shows an example of a user interface including a published feed item of the feed message in FIG. 7.

FIG. 8 shows an example of a user interface including a published feed item of the feed message in FIG. 7. A feed item 804 includes a published feed message 808, which corresponds to the feed message 712 in FIG. 7. The feed item 804 also includes a timestamp as well as selectable components for commenting on the feed item 804 and liking the feed item 804. An author 800 of the published feed message 808 is included in the feed item 804, where the author 800 is identifiable as Tom User. The author 800 may be a member or otherwise have access to the account 700 in FIG. 7. An @mention 812 is presented with the feed message 808 that corresponds to the @mention 716 in FIG. 7. As illustrated in FIG. 8, a status 816 may be presented with the @mention 812 for the User At R111, where the status 816 indicates a current status of approving access to the User At R111. In other words, the status 816 can indicate the current stage of the workflow for approving or denying access to the User At R111. Here, the status 816 indicates that access is pending. Until access is approved, the User At R111 is unable to view or access the feed item 804. In FIG. 8, while access is pending for the User At R111, the @mention 812 can be greyed out or otherwise disabled as a link until access is approved.

The feed item 804 is one rendering of the publication of the feed message 712 in FIG. 7. Publication of the feed message 712 may be rendered differently depending on one or more contextual factors, such as the feed in which the feed item is presented in. In FIG. 8, a record feed for the account, a news feed for the author 800 Tom User, and feeds of any entities with access to the account may present the feed item 804. However, a feed for a system administrator, a moderator of the account, an owner of the account, or some other user with a privilege to control user access to the account may render a different presentation of a feed item for the feed message 712.

Returning to the method 300 of FIG. 3, at block 316, information is provided to display in a second presentation of a feed associated with a third user having a privilege to control user access to the private resource and the associated feed, the information identifying the request for access to the private resource to be granted to the first user in association with the feed item. The third user and the second user have access to the private resource and the associated feed. However, the third user has privileges different than the second user. Specifically, the third user has the privilege to control user access to the private resource and the associated feed while the second user does not. For example, the third user can be the owner or moderator of the private resource while the second user can be a member of the private resource.

Accordingly, the feed associated with the third user can cause to be rendered a different presentation than the feed associated with the second user with respect to the feed item. The feed associated with the third user can have a second presentation that includes information identifying the request for access to the private resource. Such information may or may not be included in other feeds, including the feed associated with the private resource and the feed associated with the second user. In some implementations, the information can include the user ID identifying the first user. In some implementations, the information can include the current status of approving the request for access to the private resource. In some implementations, the information can include a link to a user profile of the first user, a link to a user profile of the second user, metadata regarding the first user, metadata regarding the second user, the identity of the second user, a description of the request for access, and more.

The information identifying the request for access may be accompanied by input controls for granting, denying, ignoring, or reassigning the request for access. At block 320, input controls to display in the second presentation of the feed associated with the third user are provided, the input controls configured to receive a user input to grant the request for access. In some implementations, the input controls may include one or more actionable components in the feed item for approving or denying the request for access. For example, the actionable components can include an "Approve" button and a "Deny" button. In some implementations, the information identifying the request for access may remain "sticky" or otherwise at the top of feed associated with the third user until an appropriate action is taken. However, in some implementations, the opportunity to grant the request for access may time out after a predetermined period of time. In that case, the request for access may be automatically approved or denied. Alternatively, the opportunity to grant the request for access may be reassigned after a predetermined period of time.

Figure 9:
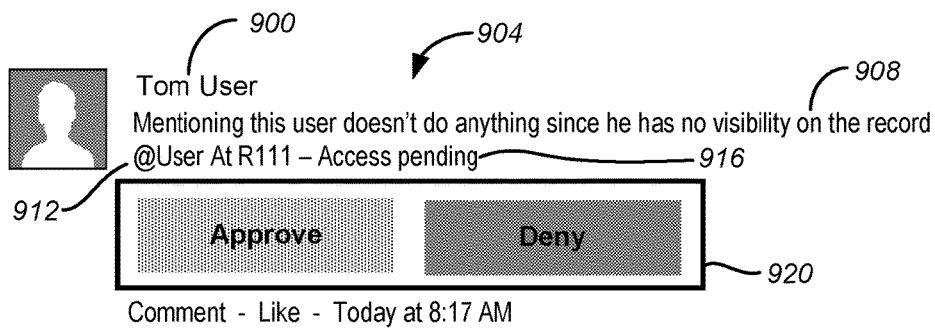
FIG. 9 shows an example of a user interface including another presentation of the published feed item of the feed message in FIG. 7 and including input controls for granting the user access to the account and its associated feed.

FIG. 9 shows an example of a user interface including another presentation of the published feed item of the feed message in FIG. 7 and including input controls for granting the user access to the account and its associated feed. Similar to the feed item 804 in FIG. 8, the feed item 904 includes a feed message 908 and an author 900 of the feed message 908. An @mention 912 to the User At R111 is presented with the feed message 908. A status 916 is presented with the @mention 912 to indicate the status of approving or denying access to the account for the User At R111.

In addition, the feed item 904 further includes a graphical display with input controls 920 for approving or denying the request for access. In FIG. 9, the input controls 920 include an "Approve" button and a "Deny" button. Such input controls 920 may be provided in the feed item 904 for a feed associated with a user having a privilege to control user access to the account. Such a user can include, for example, a system administrator, a moderator of the account, or an owner of the account (e.g., Joe).

Returning to the method 300 of the FIG. 3, at block 324, the first user may be granted, responsive to the user input, access to the private resource and the associated feed. In some implementations, granting access to the private resource and the associated feed can include updating the membership database to include the user ID identifying the first user. Other databases or data objects in the enterprise social networking system, such as a database associated with the private resource, may be updated in response to the grant of access to the first user. By way of an example, a data object tracking the workflow can be updated upon the granting of access to the first user. The data object tracking the workflow can be updated to go from access pending to access approved.

The membership database may be associated with the private resource and include specific access rights and restrictions of the users. For example, the membership database may include a privileges table. Access to the private resource may be defined by privileges stored in the privileges table. Different users having access to the private resource may have different privileges. In some implementations, different privileges may be accorded to the users identifiable as having access to the private resource according to certain attributes of the users. An attribute can include, for example, whether the user is a member or a moderator. Moreover, one member may have privileges to retrieve social networking data but not initiate social networking actions with respect to the private resource, whereas another member may have privileges to retrieve social networking data and initiate social networking actions with respect to the private resource.

A user's rights to access data and initiate actions may be limited or unlimited according to the attribute of the user. That is, the ability for a particular user to access and retrieve social network data and initiate various social networking actions may be defined as unlimited or limited in terms of one or more restrictions. Examples of social network data with respect to which privileges may be uniquely defined and customized include particular names or records, particular types of records, particular user profiles, particular types of user profiles, particular statuses of user profiles, names of groups, particular types and statuses of groups, particular names and types of CRM objects. Examples of particular social networking actions with respect to which a user can have unlimited or limited privileges include the ability to communicate with other users via one or more feeds, interact with particular records or types of records via one or more feeds, interact with one or more tasks, interact with one or more business processes, interact with CRM data, follow users, follow records, upload files, follow groups, join groups, create groups, follow organizations, and create communities.

In some implementations, access to the private resource includes unlimited privileges to retrieve social network data and initiate social networking actions available to users identifiable as having access to the private resource. In some implementations, access to the private resource includes limited privileges defined by a user having the privilege to control user access to the private resource and the associated feed.

Figure 5:
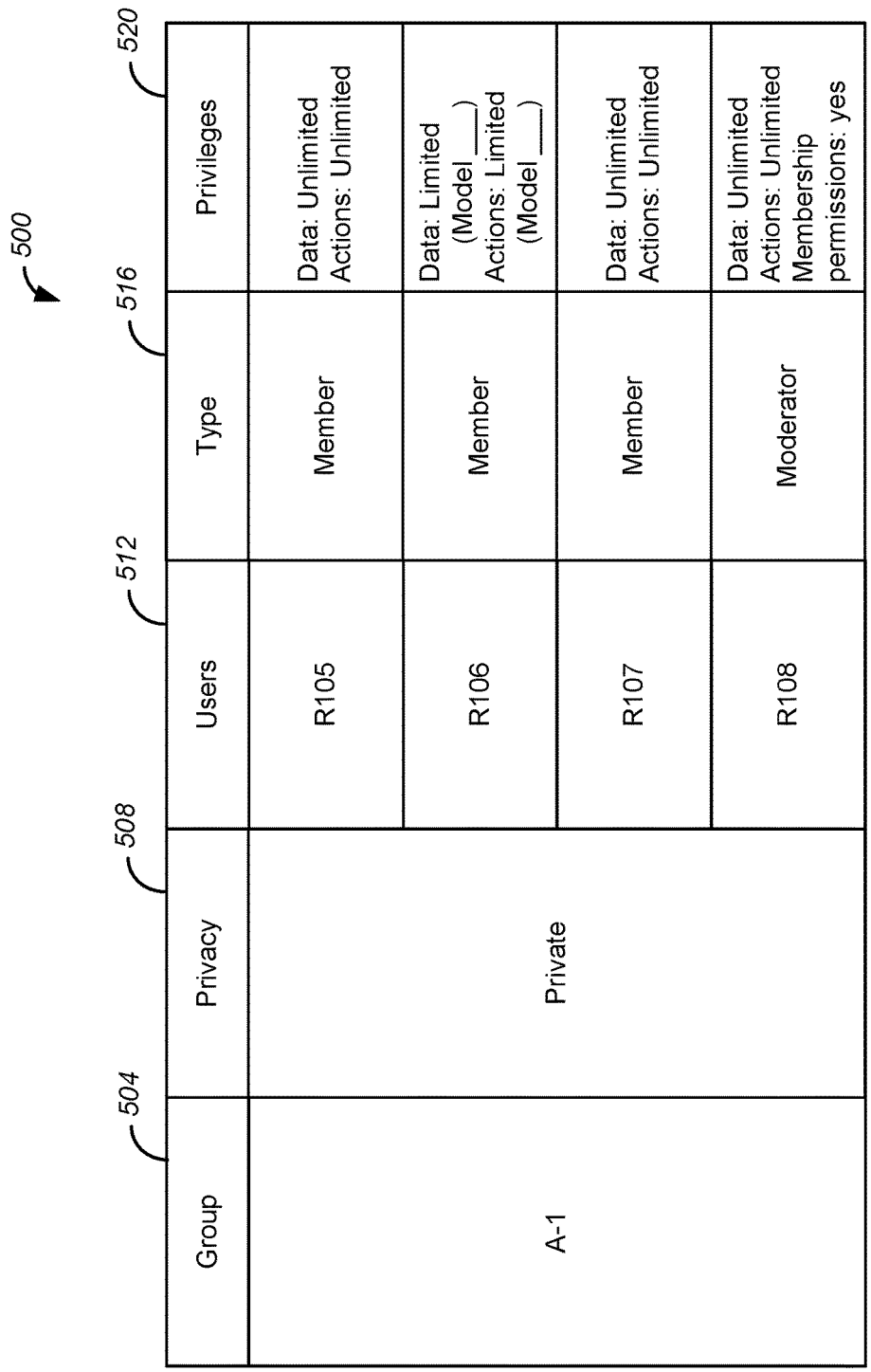
FIG. 5 shows an example of a privileges table 500 identifying rights and restrictions of users to access data and initiate actions in a private group, according to some implementations.

FIG. 5 shows an example of a privileges table 500 identifying rights and restrictions of users to access data and initiate actions in a private group, according to some implementations. The privileges table 500 may include a column 504 identifying a group A-1 in an enterprise social networking system. A column 508 may indicate the privacy setting of the group A-1, including if the group A-1 is private, semi-private, or public. Here, the column 508 is private, meaning that only users identified as having access to the group A-1 can access the group A-1. A column 512 can list each of the users R105, R106, R107, and R108 as having access to the group A-1. A column 516 can indicate a type of role each of the users R105, R106, R107, and R108 has. As illustrated in the example in FIG. 5, R105, R106, and R107 are members of the group A-1 while R108 is a moderator of the group A-1.

Each of the users R105, R106, R107, and R108 may have different privileges 520 in terms of access rights and restrictions with respect to the group A-1. R105 and R107 may have unlimited privileges to retrieve social network data and unlimited privileges to initiate social networking actions. R106 may have limited privileges to retrieve social network data and limited privileges to initiate social networking actions. As illustrated in FIG. 5, the limited privileges can be defined according to an access model, where the access model is set up and customized to specify particular restrictions for accessing and interacting with social networking data. The access model may depend on certain attributes of the user R106, such as the type of user R106 is. For example, if R106 were a low-ranking employee of the group A-1, then R106 may have limited privileges according to a more restrictive access model than if R106 were a high-ranking employee of the group A-1. R108 may have unlimited privileges to retrieve social network data and unlimited privileges to initiate social networking actions. Because R108 is a moderator of the group A-1, R108 also may manage membership permissions of the group A-1, thereby controlling the privileges 520 that each user has in the group A-1.

In some implementations, the method 300 can further include providing the feed item to display in a third presentation of a feed associated with the first user after granting access to the private resource and the associated feed, the third presentation of the feed being a news feed of the first user. After access is granted to the first user, the first user can receive a notification that access to the private resource has been granted. The first user can be notified through the feed item displayed in a third presentation of the feed associated with the first user. The feed item can include the feed message and the @mention identifying the first user. The first user is now able to view and access the feed as well as the private resource. In some implementations, the first user is able to comment, post, and otherwise contribute to the feed. The first user is approved or temporarily or permanently added as a member when the resource is a private group, or is otherwise granted limited or unlimited privilege to collaborate about, read and/or write to the private resource and any related objects or documents. In some implementations, notification can occur via other forms of media communication, such as through an email message, an SMS message, an MMS message, an instant message, and/or a separate social networking message.

The feed item in the third presentation of the feed associated with the first user may be different than the first or the second presentation of the feed. In some implementations, after granting access to the private resource and the associated feed, a modification in an appearance of the user ID may be caused in one or more of the presentations. For example, while the request for access was pending for approving or denying the first user, the user ID may be greyed out or otherwise disabled in the feed item. However, upon grant of access, the user ID in any of the feed items may no longer be greyed out, but may change in appearance. In some instances, the user ID may function as a reference or a link to a user profile of the first user after access is granted.

In some implementations, though the second user may make the request for access to the private resource from the publisher, whether access is granted can depend in part on predefined rules or logic. For instance, a user a privilege to control user access to the private resource, such as a system administrator, can establish rules for determining whether to grant access to the first user. So in addition to or in the alternative to the method 300, one or more steps in a computer-implemented method can include comparing one or more membership parameters for granting access to the private resource against an attribute of the first user, and determining that the attribute satisfies the one or more membership parameters for granting access to the first user. This can occur after a request for access is made by the second user. By way of an example, a first user may be part of one or more groups in the enterprise social networking system, may have certain roles or responsibilities, may have a certain job title, may have certain skills, may have certain preferences, may be related to other users in the enterprise social networking system, and more. Any of these attributes may satisfy one or more membership parameters, where the membership parameters may be predefined by one of the users identified as having access to the private resource. The membership parameters may be predefined by a user having a privilege to control membership to the resource. If the one or more membership parameters are satisfied, granting the first user access to the private resource and the associated feed may be automatically provided. Such rules may validate the first user to be granted access to the private resource while bypassing a separate approval step from the third user. In some implementations, however, a recommendation may be provided to display in the second presentation of the feed associated with the third user based on the determination that the attribute satisfies the one or more membership parameters. The information identifying the request for access in the second presentation of the feed may include the recommendation, which can provide the third user with more information for deciding whether to grant access or not.

Figure 4:
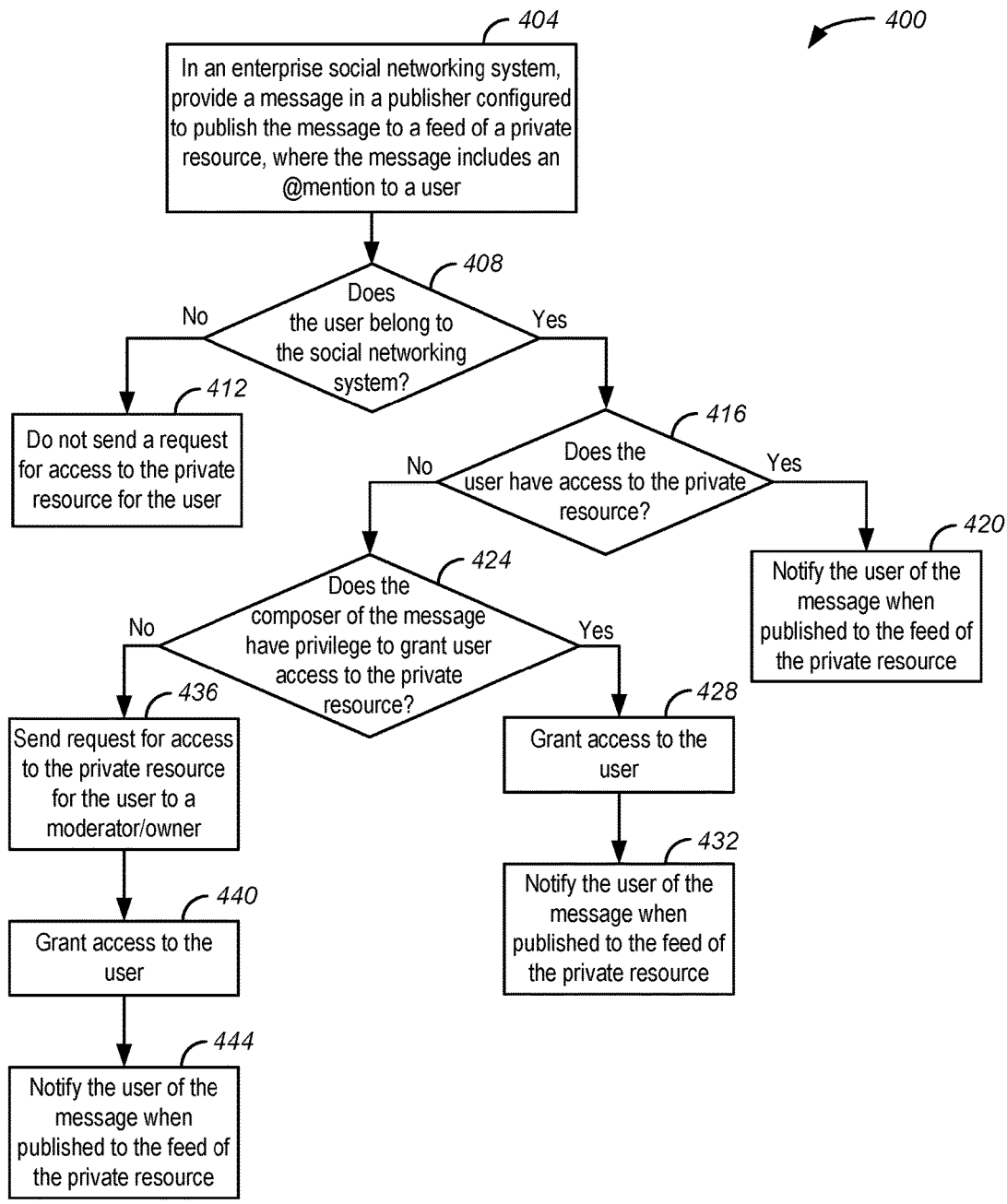
FIG. 4 shows a flowchart of an example of a workflow 400 for providing access to a private resource in an enterprise social networking system, according to some implementations.

The workflow for the processing of a sharing access to a private resource can be illustrated in FIG. 4. FIG. 4 shows a flowchart of an example of a workflow 400 for providing access to a private resource in an enterprise social networking system, according to some implementations. In block 404, a message can be provided in a publisher where the message can include a symbol in the form of an @mention to a user. The publisher may be configured to publish the message to a feed associated with a private resource. Typically, an @mention causes a notification to be generated to the user of the @mention of the message. However, whether the user is notified of the message depends on whether the user belongs to the enterprise social networking system and whether the user has access to the private resource.

At block 408, it is determined whether the user belongs to the social networking system. If the user does not belong to the social networking system, then no request for access the private resource for the user is sent, as shown in block 412. If the user does belong to the social networking system, then it is determined whether the user has access to the private resource, as shown in block 416.

If the user does have access to the private resource, then the user is notified of the message when the message is published to the feed of at least the private resource, as shown in block 420.

However, if the user does not have access to the private resource, it is determined whether the author of the message has a privilege to grant user access to the private resource, as shown in block 424. If the author of the message has a privilege to grant user access to the private resource, then access to the private resource may be granted to the user, as shown in block 428. Then the user is notified of the message when the message is published to the feed of at least the private resource, as shown in block 432.

If the author of the message does not have privilege to grant user access to the private resource, then a request for access to the private resource for the user is sent to a moderator/owner of the private resource, as shown in block 436. In some implementations, the moderator/owner may establish validation rules to determine whether to grant access to the private resource for the user. In some implementations, the moderator/owner may receive the request for access in his/her news feed. The moderator/owner may choose to grant access to the user, as shown in block 440. Then the user is notified of the message when the message is published to the feed of at least the private resource, as shown in block 444.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

While the disclosed examples are often described herein with reference to an implementation in which an on-demand database service environment is implemented in a system having an application server providing a front end for an on-demand database service capable of supporting multiple tenants, the present implementations are not limited to multi-tenant databases nor deployment on application servers. Implementations may be practiced using other database architectures, i.e., ORACLE®, DB2® by IBM and the like without departing from the scope of the implementations claimed.

It should be understood that some of the disclosed implementations can be embodied in the form of control logic using hardware and/or using computer software in a modular or integrated manner. Other ways and/or methods are possible using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system for providing access to a private resource, the system comprising:
   a database system comprising one or more hardware processors, the database system configurable to cause:
      displaying, in a user interface on a display of a user device associated with a first user of the enterprise social networking system, a publisher configured to share feed items in a feed of an enterprise social networking system, the feed being dedicated to the private resource, the private resource and the feed being accessible to only authorized users of the enterprise social networking system, the publisher comprising:
         an input area configured to receive text, and
         a first selection operable to share the text in a feed item in the feed;
      processing a first request received via the publisher, to share content associated with the private resource with a second user of the enterprise social networking system;
      determining, responsive to processing the first request, that the second user is not one of the authorized users;
      displaying, in the user interface, responsive to determining that the second user is not one of the authorized users, a second selection operable to allow the first user to request provision, to the second user, of access to the private resource; and
      displaying, on a display of an administrator device associated with an administrator, responsive to determining that the second selection has been selected, one or more input controls configured to receive administrator input to grant the second user access to the private resource.

2. The system of claim 1, wherein determining that the second user is not one of the authorized users comprises:
   comparing a user ID associated with the second user against a membership database, the membership database identifying the authorized users.

3. The system of claim 2, wherein the first request comprises text entered in the input area of the publisher, the entered text comprising a symbol in a form of a hashtag or an @mention in combination with the user ID.

4. The system of claim 1, the database system further configurable to cause:
   determining that the second selection has been selected; and
   providing to the second user, responsive to determining that the second selection has been selected, access to the private resource.

5. The system of claim 1, the database system further configurable to cause:
   determining that the second user belongs to the enterprise social networking system.

6. The system of claim 1, wherein access to the private resource comprises unlimited privileges to retrieve social network data and initiate social networking actions available to the authorized users.

7. The system of claim 1, wherein access to the private resource comprises limited privileges defined by a user having a privilege to control user access to the private resource and the feed.

8. The system of claim 1, the database system further configurable to cause:
   comparing one or more membership parameters for granting access to the private resource against an attribute of the second user;
   determining that the attribute satisfies the one or more membership parameters; and
   displaying, in the user interface and responsive to determining that the attribute satisfies the one or more membership parameters, a recommendation in association with the feed.

9. The system of claim 1,
   wherein the administrator is an authorized administrator.

10. A method for providing access to a private resource, the method comprising:
    causing display, in a user interface on a display of a user device associated with a first user of the enterprise social networking system, of a publisher configured to share feed items in a feed of an enterprise social networking system, the feed being dedicated to the private resource, the private resource and the feed being accessible to only authorized users of the enterprise social networking system, the publisher comprising:
       an input area configured to receive text, and
       a first selection operable to share the text in a feed item in the feed;
    processing a first request received via the publisher to share content associated with the private resource with a second user of the enterprise social networking system;
    determining, responsive to processing the first request, that the second user is not one of the authorized users;
    causing display, in the user interface, responsive to determining that the second user is not one of the authorized users, of a second selection operable to allow the first user to request provision, to the second user, of access to the private resource; and causing display, on a display of an administrator device associated with an administrator, responsive to determining that the second selection has been selected, of one or more input controls configured to receive administrator input to grant the second user access to the private resource.

11. The method of claim 10, wherein determining that the second user is not one of the authorized users comprises:

comparing a user ID associated with the second user against a membership database, the membership database identifying the authorized users.

12. The method of claim 11, wherein the first request comprises text entered in the input area of the publisher, the entered text comprising a symbol in a form of a hashtag or an @mention in combination with the user ID.

13. The method of claim 10, further comprising:

determining that the second selection has been selected; and providing to the second user, responsive to determining that the second selection has been selected, access to the private resource.

14. The method of claim 10, further comprising:

comparing one or more membership parameters for granting access to the private resource against an attribute of the second user;

determining that the attribute satisfies the one or more membership parameters; and displaying, in the user interface and responsive to determining that the attribute satisfies the one or more membership parameters, a recommendation in association with the feed.

15. The method of claim 10, wherein the administrator is an authorized administrator.

16. A computer program product comprising computer-readable program code capable of being executed by one or more processors when retrieved from a non-transitory computer-readable medium, the program code comprising instructions configurable to cause:

displaying, in a user interface on a display of a user device associated with a first user of the enterprise social networking system, a publisher configured to share feed items in a feed of an enterprise social networking system, the feed being dedicated to the private resource, the private resource and the feed being accessible to only authorized users of the enterprise social networking system, the publisher comprising:

an input area configured to receive text, and a first selection operable to share the text in a feed item in the feed;

processing a first request received via the publisher to share content associated with the private resource with a second user of the enterprise social networking system;

determining, responsive to processing the first request, that the second user is not one of the authorized users;

displaying, in the user interface, responsive to determining that the second user is not one of the authorized users, a second selection operable to allow the first user to request provision, to the second user, of access to the private resource; and displaying, on a display of an administrator device associated with an administrator, responsive to determining that the second selection has been selected, one or more input controls configured to receive administrator input to grant the second user access to the private resource.

17. The computer program product of claim 16, wherein determining that the second user is not one of the authorized users comprises:

comparing a user ID associated with the second user against a membership database, the membership database identifying the authorized users.

18. The computer program product of claim 16, the instructions further configurable to cause:

determining that the second selection has been selected; and providing to the second user, responsive to determining that the second selection has been selected, access to the private resource.

19. The computer program product of claim 16, the instructions further configurable to cause:

comparing one or more membership parameters for granting access to the private resource against an attribute of the second user;

determining that the attribute satisfies the one or more membership parameters; and displaying, in the user interface and responsive to determining that the attribute satisfies the one or more membership parameters, a recommendation in association with the feed.

20. The computer program product of claim 16, wherein the administrator is an authorized administrator.

* * * * *